(12) United States Patent
Ishida et al.

(10) Patent No.: US 10,054,889 B2
(45) Date of Patent: Aug. 21, 2018

(54) OPTICAL SCANNING DEVICE AND IMAGE FORMING APPARATUS INCLUDING THE SAME

(71) Applicant: KYOCERA Document Solutions Inc., Osaka (JP)

(72) Inventors: Hideki Ishida, Osaka (JP); Kazuhisa Kondo, Osaka (JP); Eiji Tatsumi, Osaka (JP); Ikuko Uneme, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/665,962

(22) Filed: Aug. 1, 2017

(65) Prior Publication Data
US 2018/0039215 A1    Feb. 8, 2018

(30) Foreign Application Priority Data
Aug. 2, 2016  (JP) ................. 2016-152300

(51) Int. Cl.
  *G03G 15/04*   (2006.01)
  *G03G 15/00*   (2006.01)
  *G02B 26/12*   (2006.01)
(52) U.S. Cl.
  CPC ......... *G03G 15/5062* (2013.01); *G02B 26/12* (2013.01); *G03G 15/0409* (2013.01); *G03G 15/04036* (2013.01); *G03G 15/55* (2013.01)

(58) Field of Classification Search
  CPC ......... G03G 15/5062; G03G 15/04036; G03G 2215/0402; G03G 15/0409; G03G 15/55; G02B 26/10; G02B 26/125
  See application file for complete search history.

(56) References Cited

U.S. PATENT DOCUMENTS

| | | | | |
|---|---|---|---|---|
| 5,828,925 A | * | 10/1998 | Yoshizawa | H04N 1/00002 347/116 |
| 2004/0179087 A1 | * | 9/2004 | Yoshizawa | G02B 26/123 347/232 |
| 2009/0244669 A1 | * | 10/2009 | Uchikawa | G02B 26/101 359/202.1 |
| 2009/0324292 A1 | * | 12/2009 | Oda | G02B 7/022 399/206 |
| 2011/0310455 A1 | * | 12/2011 | Serizawa | G03G 15/04036 359/207.11 |
| 2013/0033558 A1 | * | 2/2013 | Akatsu | B41J 2/455 347/224 |

FOREIGN PATENT DOCUMENTS

JP      9-15523     1/1997

* cited by examiner

*Primary Examiner* — Sophia S Chen
(74) *Attorney, Agent, or Firm* — Wenderoth, Lind & Ponack L.L.P.

(57) ABSTRACT

An image forming apparatus includes a mirror position adjustment mechanism capable of adjusting a position of a return mirror. The return mirror is used in a state in which its position is adjusted such that a gravity center position of the return mirror is separated from a rotational axis of the return mirror by the mirror position adjustment mechanism in a sub-scanning direction.

4 Claims, 14 Drawing Sheets

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2016-152300 filed on Aug. 2, 2016, the entire contents of which are incorporated herein by reference.

BACKGROUND

The technology of the present disclosure relates to an optical scanning device and an image forming apparatus including the same.

Conventionally, there has been known an optical scanning device that is installed in an electrophotographic image forming apparatus, irradiates light beam corresponding to image data to the surface of a photosensitive drum, and scans the light beam in a main scanning direction.

The optical scanning device includes a light source, a rotating polygon mirror that reflects light beam emitted from the light source and deflects and scans the reflected light beam, and an image forming lens that forms an image of the light beam reflected by the rotating polygon mirror on a surface to be scanned.

In the aforementioned optical scanning device, in order to enhance the degree of freedom of an optical path layout, a return mirror may be provided in an optical path from the rotating polygon mirror to the surface to be scanned.

The return mirror has a rectangular column shape long in the main scanning direction. The return mirror is supported from a surface side (a reflection surface side) by four support pins. The return mirror is pushed to the four support pins by a pressing spring. The four support pins abut four corners of the surface of the return mirror.

When the rotating polygon mirror is rotated according to the operation of the optical scanning device, vibration from the rotating polygon mirror is transmitted to the return mirror. As a consequence, bending vibration or rotational vibration is generated in the return mirror.

The bending vibration is vibration by which a center part of the return mirror in the main scanning direction reciprocally displaces in a mirror thickness direction with respect to both end portions of the return mirror. When the bending vibration is generated, density unevenness considerably occurs at a center part of a printed image in the main scanning direction.

On the other hand, the rotational vibration is vibration by which the return mirror alternately displaces in a clockwise direction and a counterclockwise direction when the return mirror is viewed from the main scanning direction. The rotation center of the return mirror is decided by support positions of the return mirror by a plurality of support pins. When the rotational vibration is generated in the return mirror, density unevenness considerably occurs over the whole area of a printed image in the main scanning direction.

SUMMARY

An optical scanning device according to one aspect of the present disclosure includes a light source, a rotating polygon mirror, a return mirror, a plurality of support pins, and a mirror position adjustment mechanism. The rotating polygon mirror reflects light beam emitted from the light source and deflects and scans the reflected light beam. The return mirror is provided to extend in a main scanning direction, reflects the light beam reflected by the aforementioned rotating polygon mirror, and leads the reflected light beam to a surface to be scanned. The plurality of support pins support the return mirror from one side surface in a thickness direction. The mirror position adjustment mechanism is configured to be able to move the aforementioned return mirror in a sub-scanning direction. The position of the aforementioned return mirror is adjusted by the aforementioned mirror position adjustment mechanism such that a gravity center position of the aforementioned return mirror is separated in the sub-scanning direction from a rotational axis of the return mirror at a time of rotational vibration, which is decided by support positions of the aforementioned return mirror by the aforementioned plurality of support pins.

DETAILED DESCRIPTION

Hereinafter, an example of an embodiment is described in detail on the basis of the drawings. It is noted that the technology of the present disclosure is not limited to the following embodiments.

Embodiment 1

Figure 1:
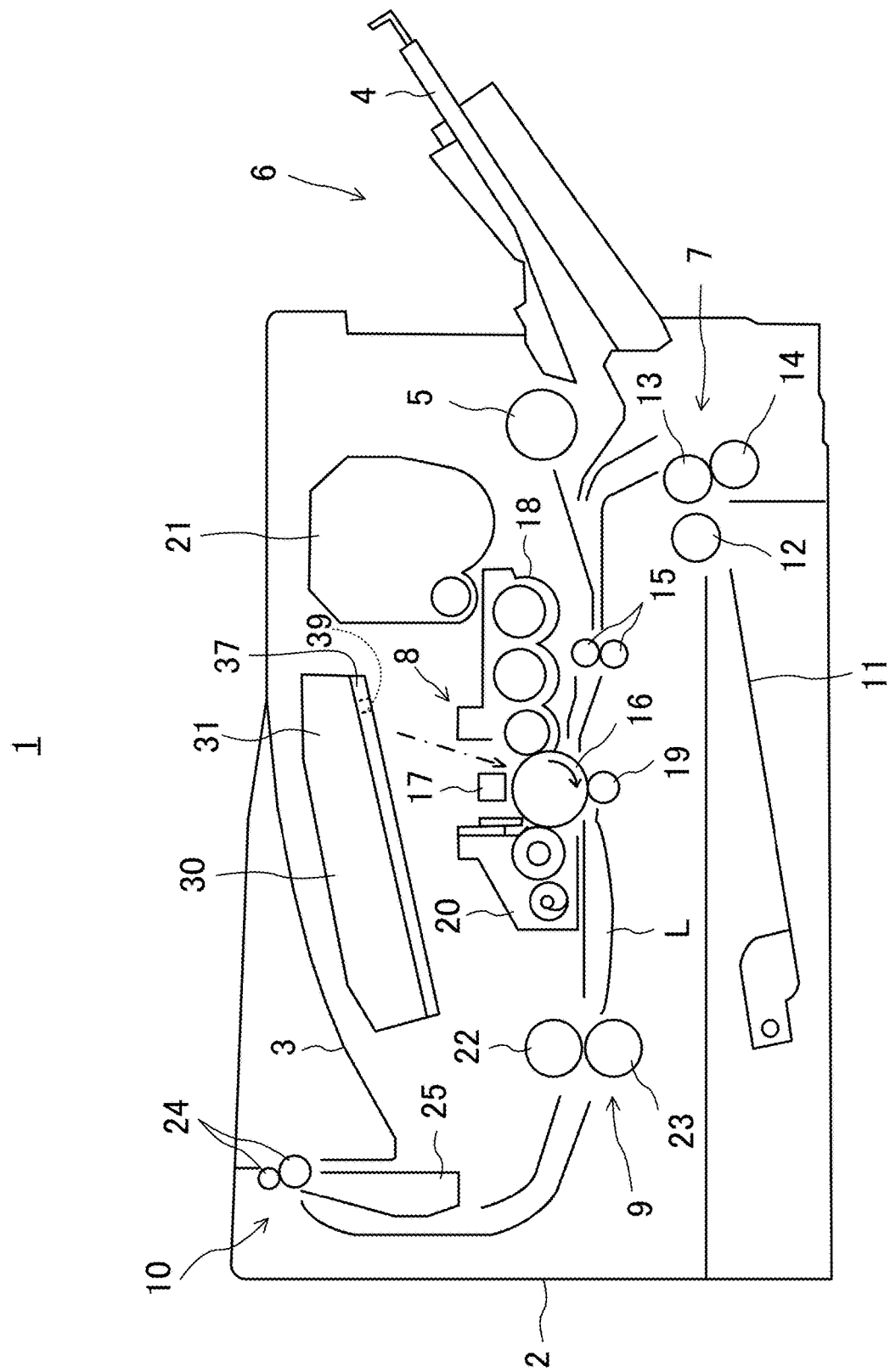
FIG. 1 is an image forming apparatus provided with an optical scanning device in an embodiment.

FIG. 1 is a sectional view illustrating a schematic configuration of a laser printer 1 as an image forming apparatus in the present embodiment.

As illustrated in FIG. 1, the laser printer 1 includes a box-like printer body 2, a manual sheet feeding unit 6, a cassette sheet feeding unit 7, an image forming unit 8, a fixing device 9, and a sheet discharge unit 10. The laser printer 1 is configured to form an image on a sheet on the basis of image data transmitted from a terminal (not illustrated) and the like while conveying the sheet along a conveyance path L in the printer body 2.

The manual sheet feeding unit 6 has a manual tray 4 provided at one side portion of the printer body 2 so as to be openable and closable, and a manual sheet feeding roller 5 provided in the printer body 2 so as to be rotatable.

The cassette sheet feeding unit 7 is provided at a bottom portion of the printer body 2. The cassette sheet feeding unit 7 includes a sheet feeding cassette 11 that stores a plurality of sheets overlapped one another, a pick-up roller 12 that takes out the sheets in the sheet feeding cassette 11 one by one, and a feed roller 13 and a retard roller 14 that separate the taken-out sheets one by one and send the separated sheet to the conveyance path L.

The image forming unit 8 is provided above the cassette sheet feeding unit 7 in the printer body 2. The image forming unit 8 includes a photosensitive drum 16, a charging device 17, a developing part 18, a transfer roller 19, a cleaning part 20, a toner hopper 21, and an optical scanning device 30. The image forming unit 8 forms a toner image on the sheet supplied from the manual sheet feeding unit 6 or the cassette sheet feeding unit 7.

At the conveyance path L, a pair of resist rollers 15 are provided to temporarily keep the sent sheet waiting and then supply the sheet to the image forming unit 8 at a predetermined timing.

The fixing device 9 is arranged at a lateral side of the image forming unit 8. The fixing device 9 includes a fixing roller 22 and a pressure roller 23 which rotate while being brought into press contact with each other. The fixing device 9 fixes a toner image, which has been transferred to the sheet in the image forming unit 8, to the sheet.

The sheet discharge unit 10 is provided above the fixing device 9. The sheet discharge unit 10 includes a sheet discharge tray 3, a sheet discharge roller pair 24 for conveying the sheet to the sheet discharge tray 3, and a plurality of conveying guide ribs 25 for guiding the sheet to the sheet discharge roller pair 24. The sheet discharge tray 3 is formed in a concave shape at an upper portion of the printer body 2.

When the laser printer 1 receives image data, the photosensitive drum 16 in the image forming unit 8 is rotationally driven and the charging device 17 charges the surface of the photosensitive drum 16.

Then, light beam is emitted from the optical scanning device 30 to the photosensitive drum 16 on the basis of the image data. The light beam is irradiated, so that an electrostatic latent image is formed on the surface of the photosensitive drum 16. The electrostatic latent image is developed by toner charged in the developing device 18, so that the electrostatic latent image is visualized as a toner image.

Thereafter, the sheet supplied from the sheet feeding cassette 11 passes through between the transfer roller 19 and the photosensitive drum 16. At this time, the toner image carrier on the surface of the photosensitive drum 16 is moved to a printing surface of the sheet by electrostatic attraction from the transfer roller 19. In this way, the toner image of the photosensitive drum 16 is transferred to the sheet. The sheet with the toner image transferred thereto is heated and pressed by the fixing roller 22 and the pressure roller 23 in the fixing device 9. As a consequence, the toner image is fixed to the sheet.

Figure 2:
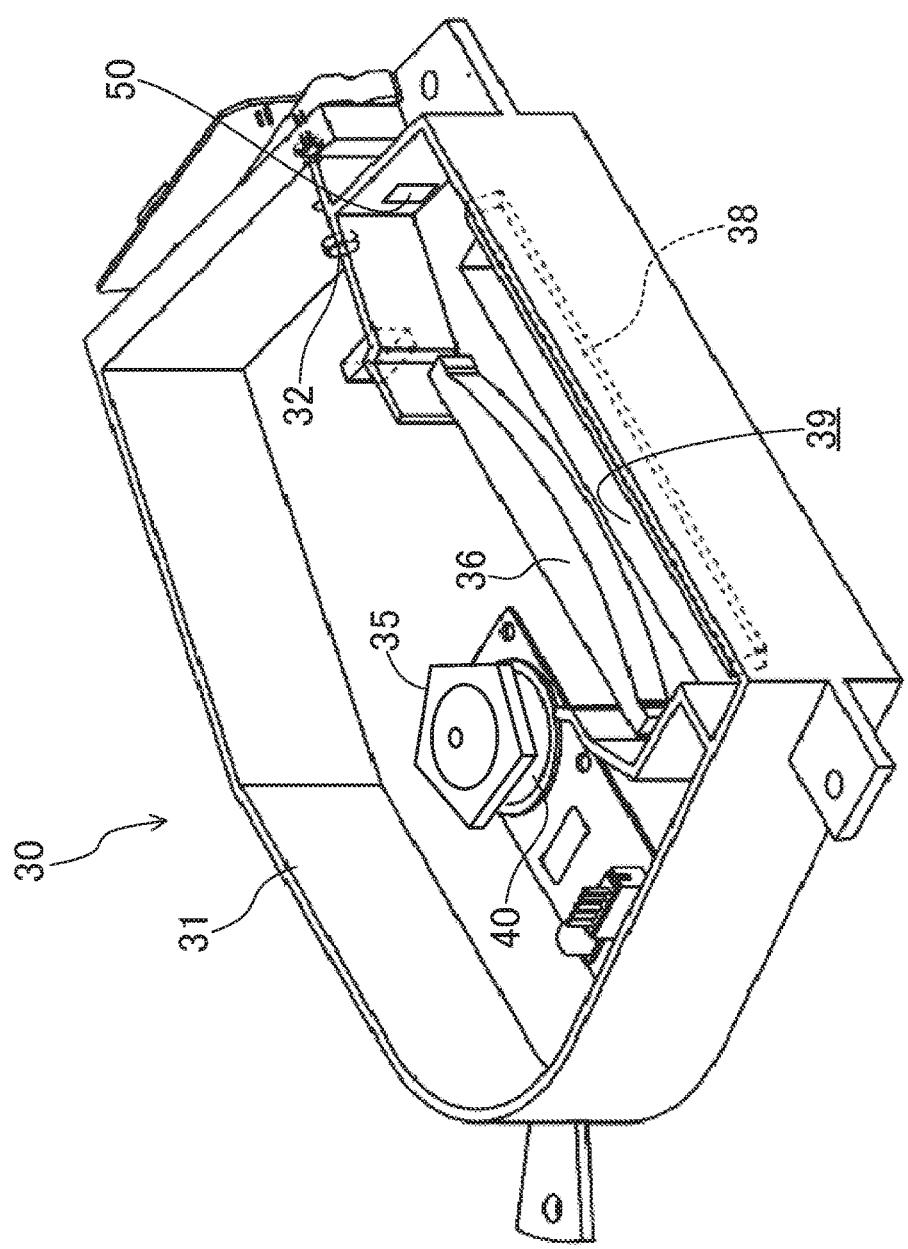
FIG. 2 is a perspective view illustrating an optical scanning device.
Figure 3:
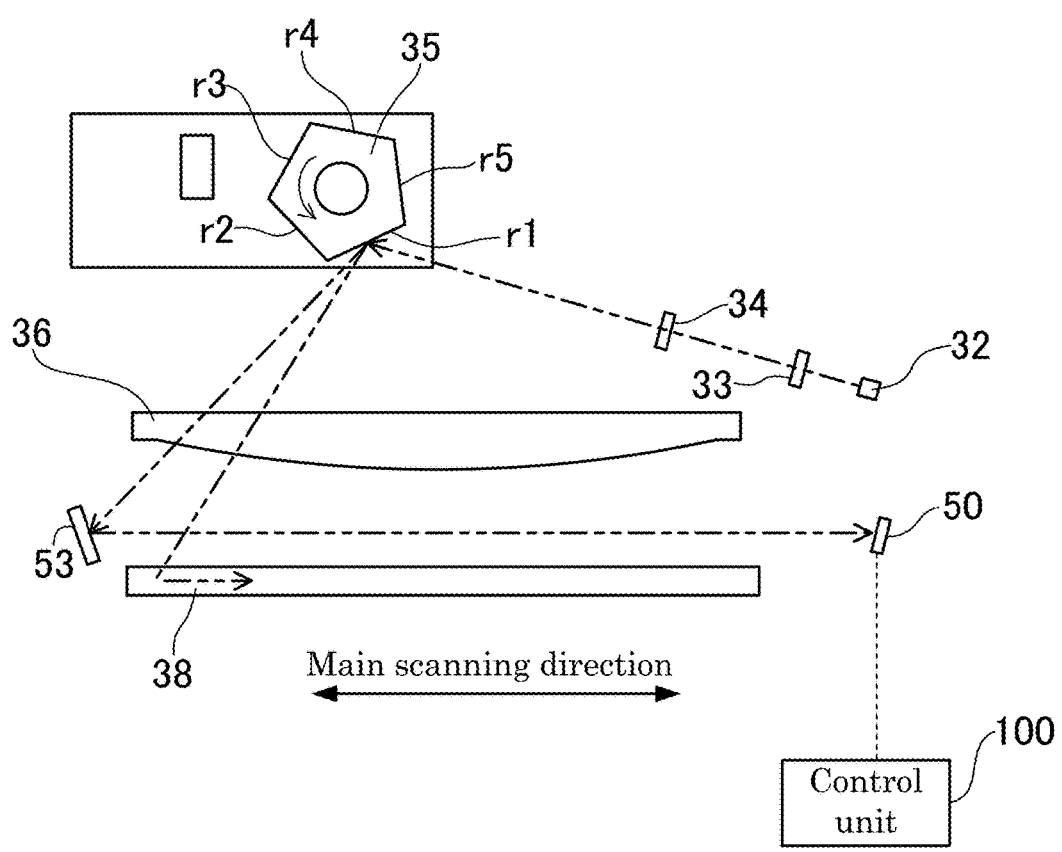
FIG. 3 is a schematic view viewed from a rotation shaft direction of a polygon mirror indicating a scanning optical system of an optical scanning device.

Next, with reference to FIG. 2 and FIG. 3, details of the optical scanning device 30 are described. The optical scanning device 30 includes a housing 31 (illustrated only in FIG. 2), a polygon mirror 35 accommodated in the housing 31 to deflect and scan light beam from a light source 32, an image forming lens 36 that forms an image of the light beam deflected and scanned by the polygon mirror 35, a return mirror 38 that reflects the light beam having passed through the image forming lens 36 and leads the reflected light beam to the surface of the photosensitive drum 16, and a lid member 37 (illustrated only in FIG. 1) mounted at the housing 31.

The polygon mirror 35 is provided at a bottom portion of the housing 31 via a polygon motor 40. The polygon mirror 35 is a rotating polygon mirror and is rotationally driven by the polygon motor 40.

As illustrated in FIG. 2, the light source 32 is arranged at a sidewall portion of the housing 31. The light source 32, for example, is a laser light source having a laser diode. The light source 32 is configured to emit laser beam (light beam) toward the polygon mirror 35. Between the light source 32 and the polygon mirror 35, a collimator lens 33 (see FIG. 3) and a cylindrical lens 34 are arranged.

As illustrated in FIG. 2, the image forming lens 36 is installed at the bottom portion of the housing 31 at a side of the polygon mirror 35. The image forming lens 36 extends along the bottom of the housing 31 in the main scanning direction.

Inside the housing 31, the return mirror 38 is arranged at a side opposite to a side of the image forming lens 36, which faces the polygon mirror 35. The return mirror 38 forms a rectangular column shape long in the main scanning direction. One side surface of the return mirror 38 in the thickness direction serves as a reflection surface for reflecting light beam.

Figure 7:
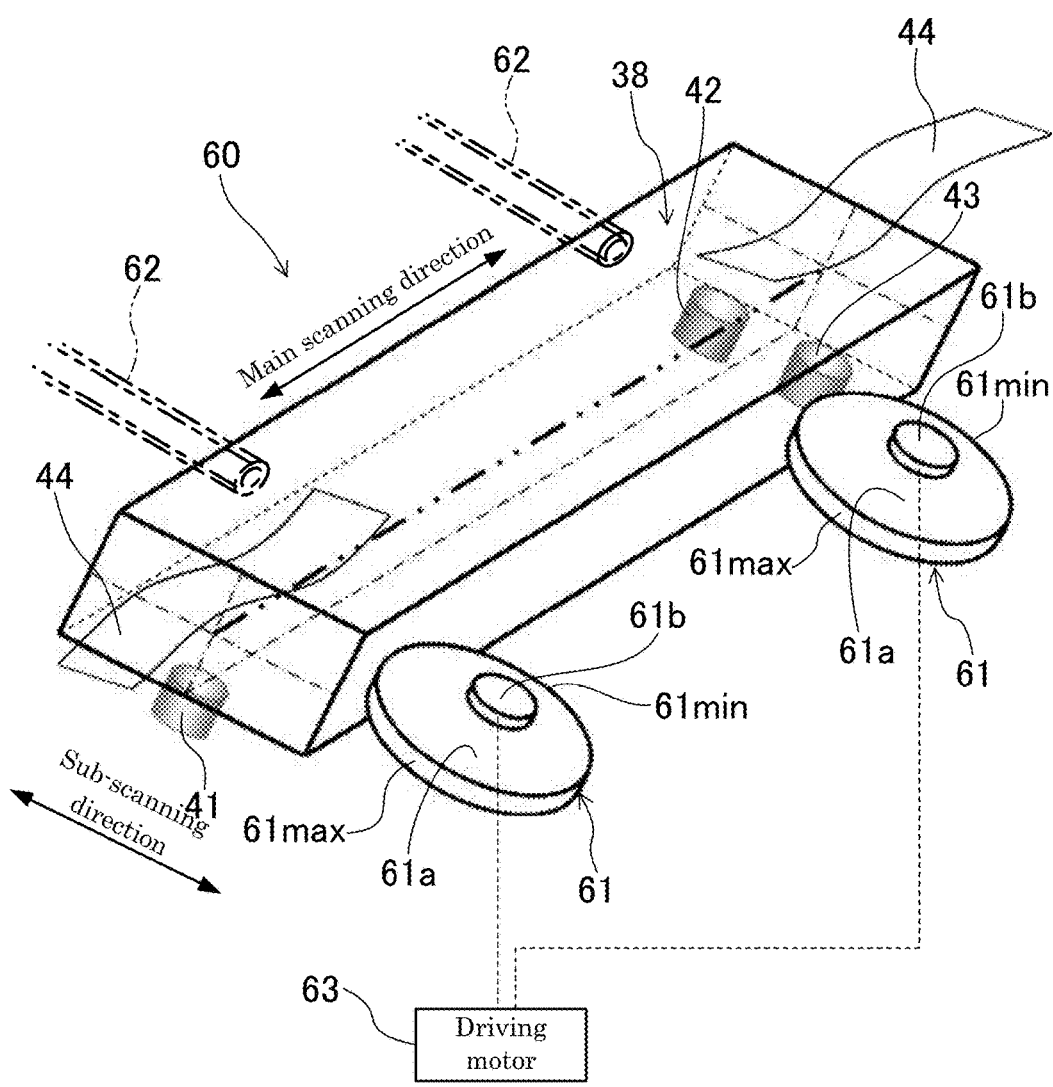
FIG. 7 is a perspective view illustrating a mirror position adjustment mechanism.

The return mirror 38 is supported from a surface side (a reflection surface side) by a first support pin 41, a second support pin 42, and a third support pin 43 (see FIG. 7). Each distal end portion of the support pins 41 to 43 forms a spherical shape and is brought into point contact with both end portions at the reflection surface side of the return mirror 38 in the main scanning direction. At both end portions on the surface of the return mirror 38 in the main scanning direction, leaf springs 44 are respectively provided. The return mirror 38 is pushed to the distal end portion of each of the support pins 41 to 43 by a pair of leaf springs 44.

At a place facing one side end portion of the return mirror 38 in the main scanning direction at the sidewall portion of the housing 31, a synchronization detection sensor 50 (see FIG. 3) is arranged. In the vicinity of the other side end portion of the return mirror 38 in the main scanning direction, a synchronization detection mirror 53 is provided. The synchronization detection mirror 53 reflects light beam, which is deflected by the polygon mirror 35 and progresses through an optical path deviated from an effective scanning range (a range in which image data is actually written), and allows the light beam to be incident into the synchronization detection sensor 50.

The synchronization detection sensor 50, for example, is configured by a photodiode, a phototransistor, a photo IC and the like. When light beam is detected, the synchronization detection sensor 50 outputs a detection signal indicating the detection of the light beam to a control unit 100.

The control unit 100, for example, includes a microcomputer having a CPU, an ROM, and an RAM, and starts to emit light beam corresponding to image data by the light source 32 after a predetermined time passes from the reception of the synchronization detection signal.

The laser beam emitted from the light source 32 is converted into parallel light beam by the collimator lens 33, and is collected on a reflection surface of the polygon mirror 35 by the cylindrical lens 34. The laser beam collected by the polygon mirror 35 is reflected by the reflection surface of the polygon mirror 35, and is incident into the image forming lens 36 as scanning light. The scanning light having passed through the image forming lens 36 is reflected by the return mirror 38 toward the photosensitive drum 16 outside the housing 31 via an opening 39 (see FIG. 1). By so doing, an image of the scanning light is formed on the surface (corresponding to a surface to be scanned) of the photosensitive drum 16. The scanning light having the image formed on the surface of the photosensitive drum 16 scans the surface of the photosensitive drum 16 in the main scanning direction according to the rotation of the polygon mirror 35, and scans the surface of the photosensitive drum 16 in a sub-scanning direction according to the rotation of the photosensitive drum 16, thereby forming an electrostatic latent image on the surface of the photosensitive drum 16.

Figure 4:
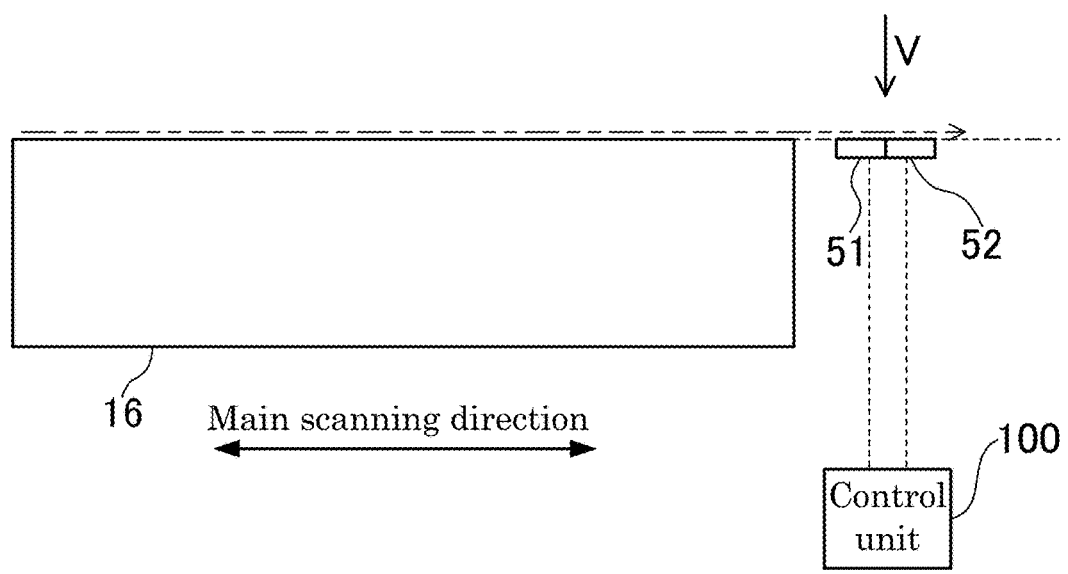
FIG. 4 is a plan view when a photosensitive drum is viewed from the top.

As illustrated in FIG. 4, at a side of the photosensitive drum 16, a first light detection sensor 51 and a second light detection sensor 52 are adjacently arranged to detect position deviation of light beam in the sub-scanning direction on the surface (the surface to be scanned) of the photosensitive drum 16.

The first light detection sensor 51 and the second light detection sensor 52, for example, are configured by a photodiode, a phototransistor, a photo IC and the like.

Figure 5:
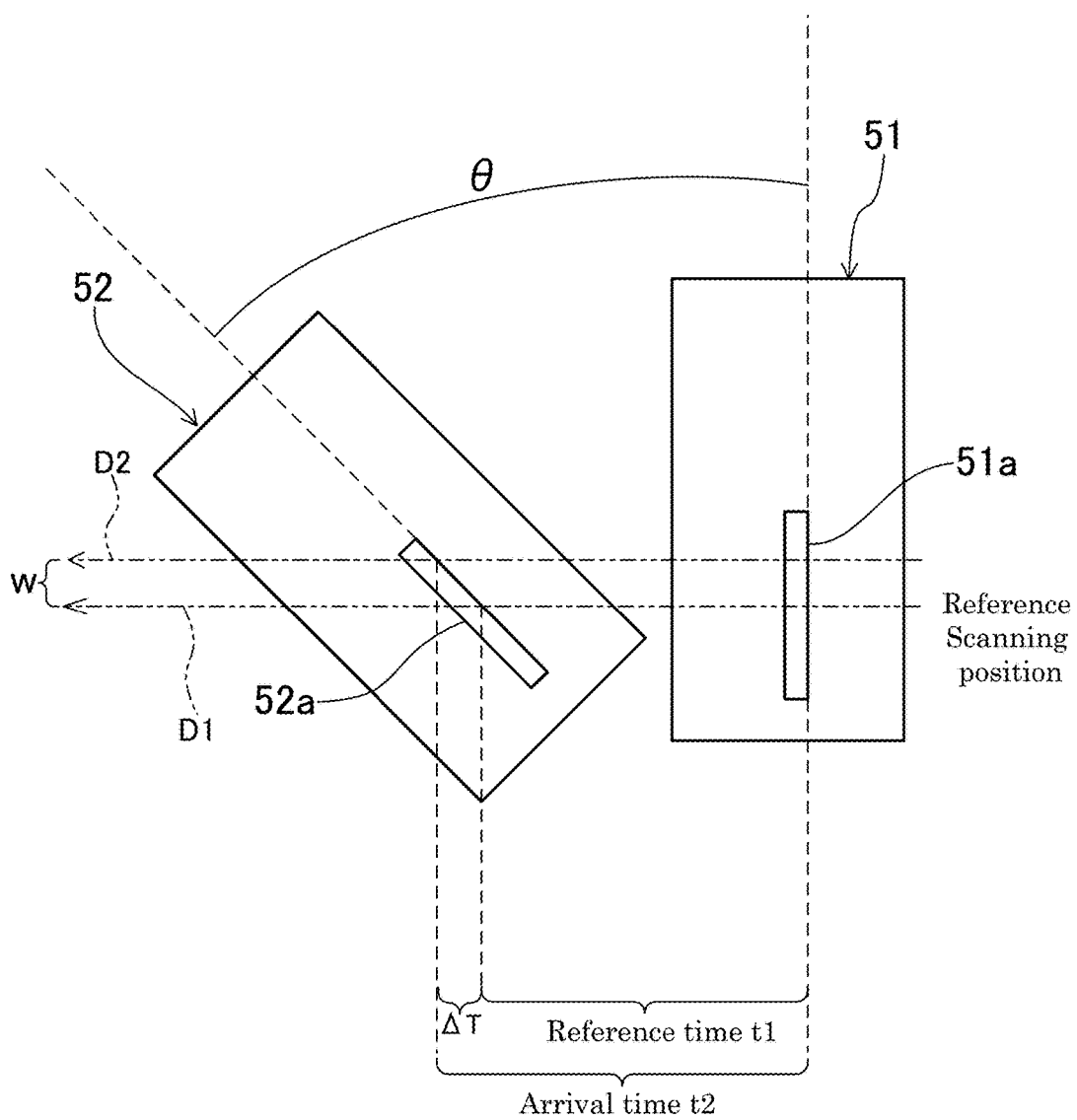
FIG. 5 is a view viewed in the arrow direction of V of FIG. 4.

As illustrated in FIG. 5, the first light detection sensor 51 and the second light detection sensor 52 have elongated rectangular detection regions 51a and 52a, respectively. The rectangular detection regions 51a and 52a intersect with each other at angles different from each other with respect to the scanning direction (the main scanning direction) of the light beam. The first light detection sensor 51 is arranged such that the detection region 51a extends in the sub-scanning direction perpendicular to the main scanning direction. The second light detection sensor 52 is arranged such that the detection region 52a is inclined with respect to the sub-scanning direction by a predetermined angle $\theta$. Herein, $\theta$ may be any angles if it is larger than 0 and is smaller than $\pi/2$, and in the present embodiment, $\theta$ is set to $\pi/4$ for example. When the light beam is detected, the first light detection sensor 51 and the second light detection sensor 52 output detection signals indicating the detection of the light beam to the control unit 100, respectively.

The control unit 100 calculates a position deviation amount of the light beam in the sub-scanning direction based on the detection signals from the first light detection sensor 51 and the second light detection sensor 52. The control unit 100 performs mirror position adjustment control to be described later based on the calculated position deviation amount. The control unit 100 corresponds to a position deviation detection unit.

Figure 6:
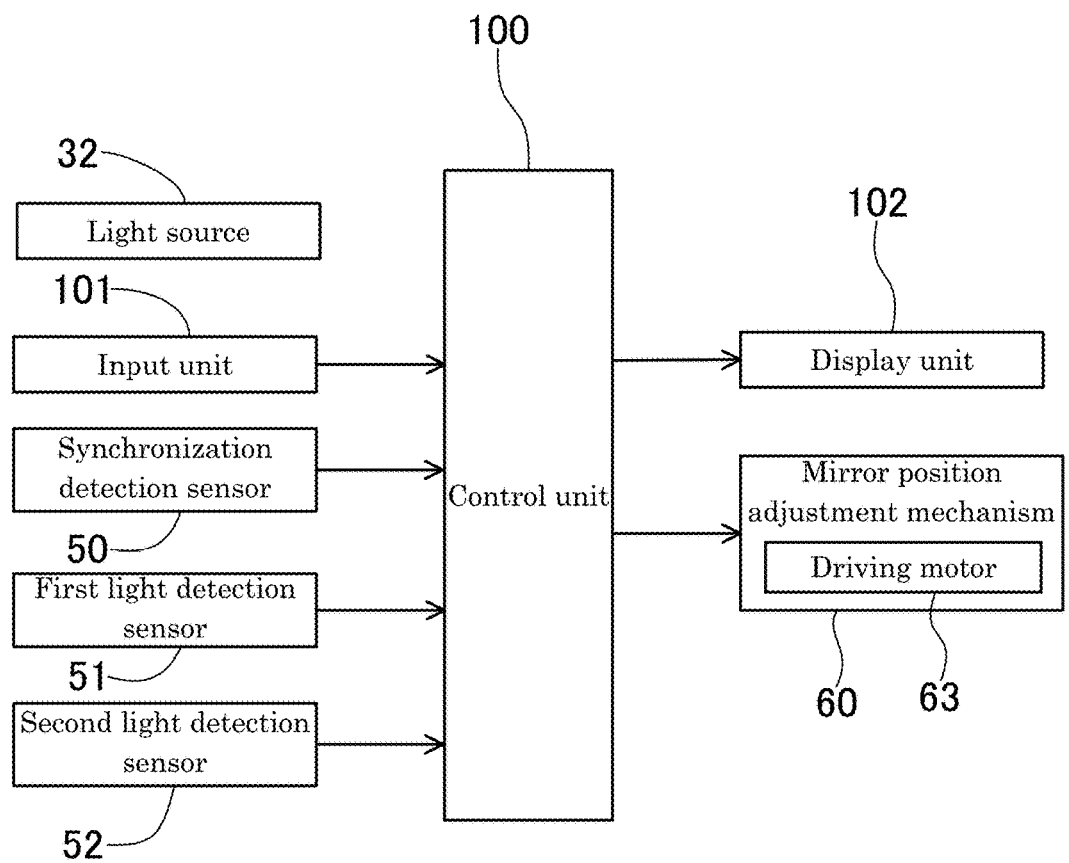
FIG. 6 is a block diagram illustrating a control system associated with control of a mirror position adjustment mechanism.

FIG. 6 is a block diagram illustrating a configuration of a control system associated with the mirror position adjustment control. The control unit 100 is electrically connected to the aforementioned light source 32, a mirror position adjustment mechanism 60, an input unit 101, and a display unit 102, which are described later, in addition to the first light detection sensor 51 and the second light detection sensor 52. The display unit 102 also serve as a setting unit used for a user to set a target movement amount.

The input unit 101, for example, is configured by an operating panel or a touch type liquid crystal display. A user, for example, can set an operation mode of the laser printer 1 via the input unit 101. In the present embodiment, a print mode and an adjustment mode can be switched as the operation mode.

The display unit 102, for example, is configured by a liquid crystal display and the like, receives a command from the control unit 100, and displays necessary information on a screen.

When the print mode has been set by the input unit 101, the control unit 100 starts writing of image data by the light source 32 after a predetermined time passes from the reception of the detection signal from the first light detection sensor 51.

When the adjustment mode has been set by the input unit 101, the control unit 100 calculates a deviation amount of light beam in the sub-scanning direction from a reference position based on the detection signals from the first light detection sensor 51 and the second light detection sensor 52, and performs mirror position adjustment control based on the calculated position deviation amount.

The mirror position adjustment control is control for suppressing rotational vibration of the return mirror 38 which is generated according to the rotation of the polygon mirror 35. The rotational vibration of the return mirror 38 is a phenomenon that the return mirror 38 vibrates around a shaft line extending in the main scanning direction. The degree of the generation of the rotational vibration is changed by the support positions of the return mirror 38 by the first support pin 41 to the third support pin 43. In the present embodiment, the position of the return mirror 38 in the sub-scanning direction is adjusted by the mirror position adjustment mechanism 60 to adjust the support positions of the return mirror 38 by the support pins 41 to 43, so that the rotational vibration of the return mirror 38 is suppressed.

As illustrated in FIG. 7, the mirror position adjustment mechanism 60 has a pair of cam members 61, a pair of urging members 62, and a driving motor 63.

Each cam member 61 has a disc-shaped cam part 61a and a columnar shaft 61b formed coaxially with the disc-shaped cam part 61a. An axial center of the disc-shaped cam part 61a is eccentric to a shaft line of the shaft 61b. That is, the disc-shaped cam part 61a is an eccentric cam having a maximum diameter part and a minimum diameter part. An outer peripheral surface of each disc-shaped cam part 61a abuts both end portions of the return mirror 38 in the main scanning direction at one side end surface of the return mirror 38 in the sub-scanning direction.

The pair of urging members 62 are arranged to face each cam member 61 while interposing the return mirror 38 therebetween. The pair of urging members 62 abut the other side end surface of the return mirror 38 in the sub-scanning direction. The pair of urging members 62, for example, are configured by a compression coil spring and always push the return mirror 38 to the outer peripheral surfaces of the disc-shaped cam parts 61*a*.

The driving motor 63 is an electric motor for rotationally driving the cam members 61, and is connected to the shafts 61*b* of the cam members 61 via a gear mechanism (not illustrated). The driving motor 63 is controlled by the control unit 100.

Next, operation of the mirror position adjustment mechanism 60 is described with reference to FIG. 7 and FIG. 8. The return mirror 38 linearly reciprocates between an initial position and a maximum adjustment position by the mirror position adjustment mechanism 60.

Figure 8A:
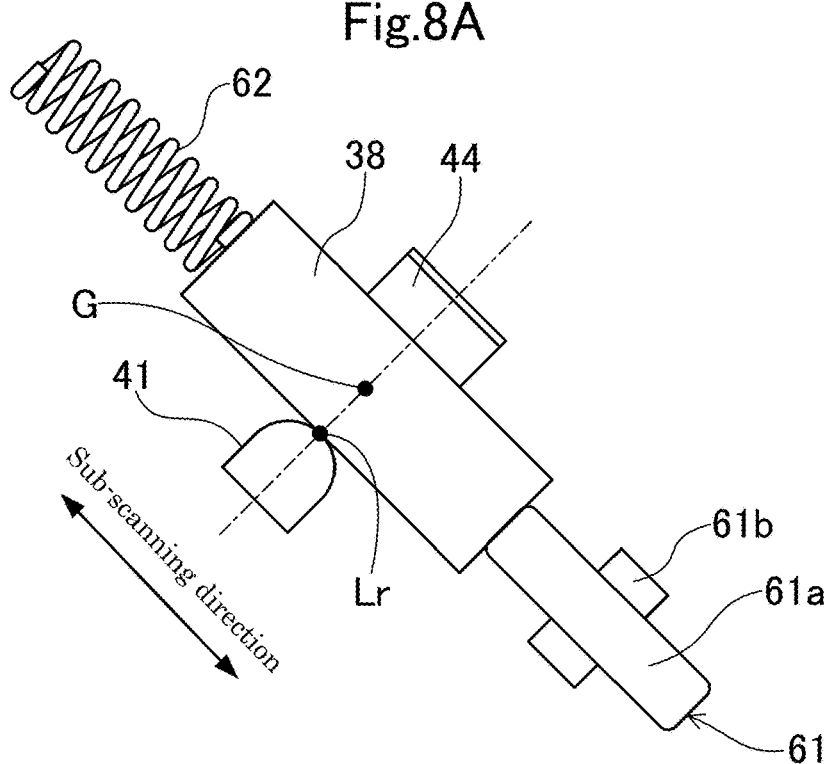
FIG. 8A is a side view illustrating a mirror position adjustment mechanism when viewed from a longitudinal direction of a return mirror and is a view illustrating a state in which a rotation center of a return mirror and a gravity center position of the return mirror coincide with each other in a sub-scanning direction.
Figure 9A:
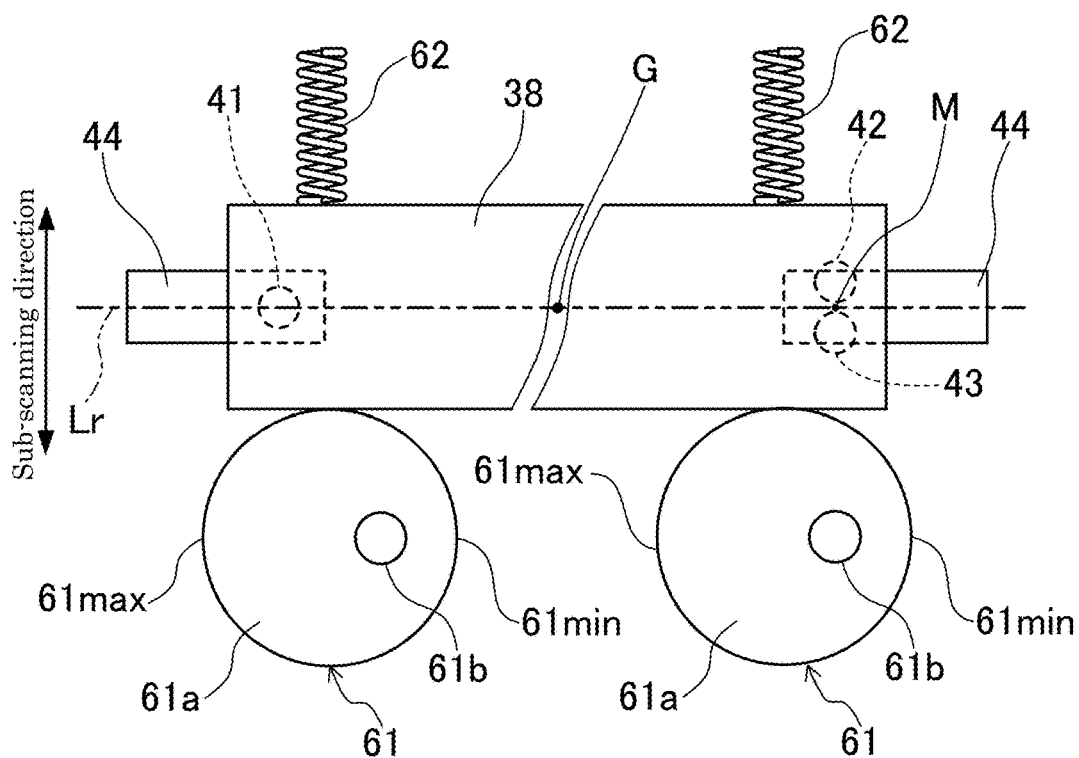
FIG. 9A is a plan view illustrating a mirror position adjustment mechanism when viewed from a reflection surface side of a return mirror and is a view illustrating a state in which a rotation center of a return mirror and a gravity center position of the return mirror coincide with each other in a sub-scanning direction.

FIG. 8A and FIG. 9A illustrate a state in which the return mirror 38 is in the initial position. In this initial position, a part, which is positioned exactly in the middle between a minimum diameter part 61min and a maximum diameter part 61max on the outer peripheral surface of the disc-shaped cam part 61*a*, abuts one side surface of the return mirror 38 in the sub-scanning direction.

The gravity center position G of the return mirror 38 is positioned on the rotational axis Lr in the sub-scanning direction. Herein, the rotational axis Lr is a shaft line (a virtual line) serving as a rotation center when the rotational vibration of the return mirror 38 is generated and extends in parallel to the main scanning direction in the present embodiment. The rotational axis Lr is a straight line passing through a support position of the return mirror 38 supported by the first support pin 41 and a middle point M between support positions of the return mirror 38 supported by the second support pin 42 and the third support pin 43 when viewed from the thickness direction of the return mirror 38 (see FIG. 9A). It is noted that in FIG. 8A and FIG. 8B, the support pins 42 and 43 are not illustrated in order to make the drawings clearly visible.

Figure 8B:
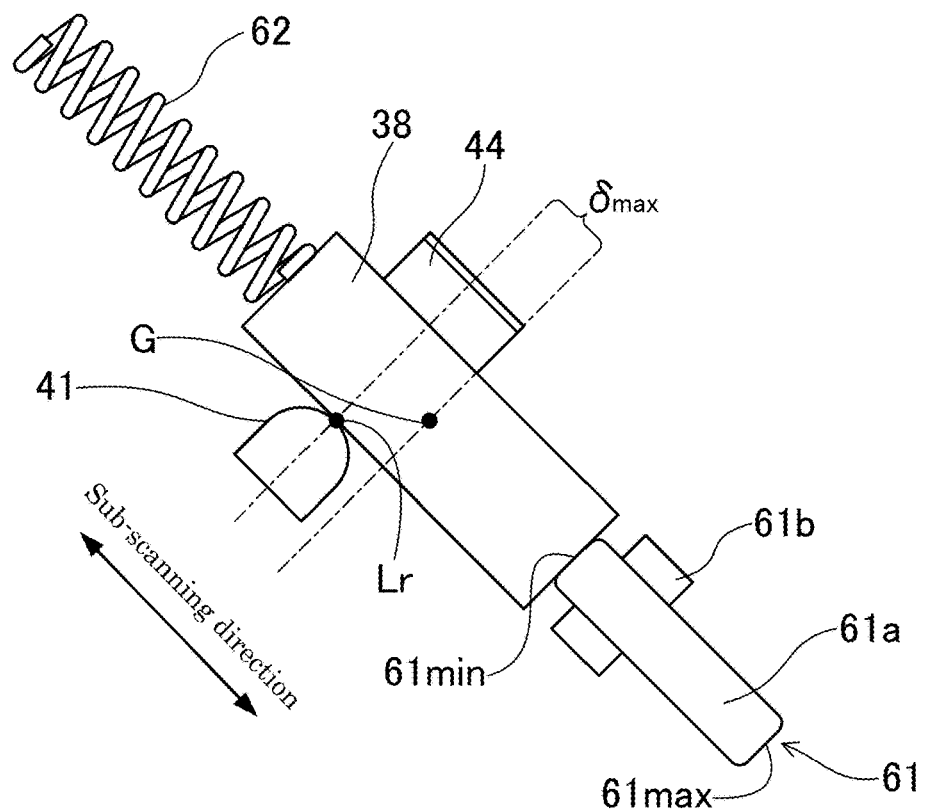
FIG. 8B is a side view illustrating a mirror position adjustment mechanism when viewed from a longitudinal direction of a return mirror and is a view illustrating a state in which a rotation center of a return mirror and a gravity center position of the return mirror are deviated from each other in a sub-scanning direction.
Figure 9B:
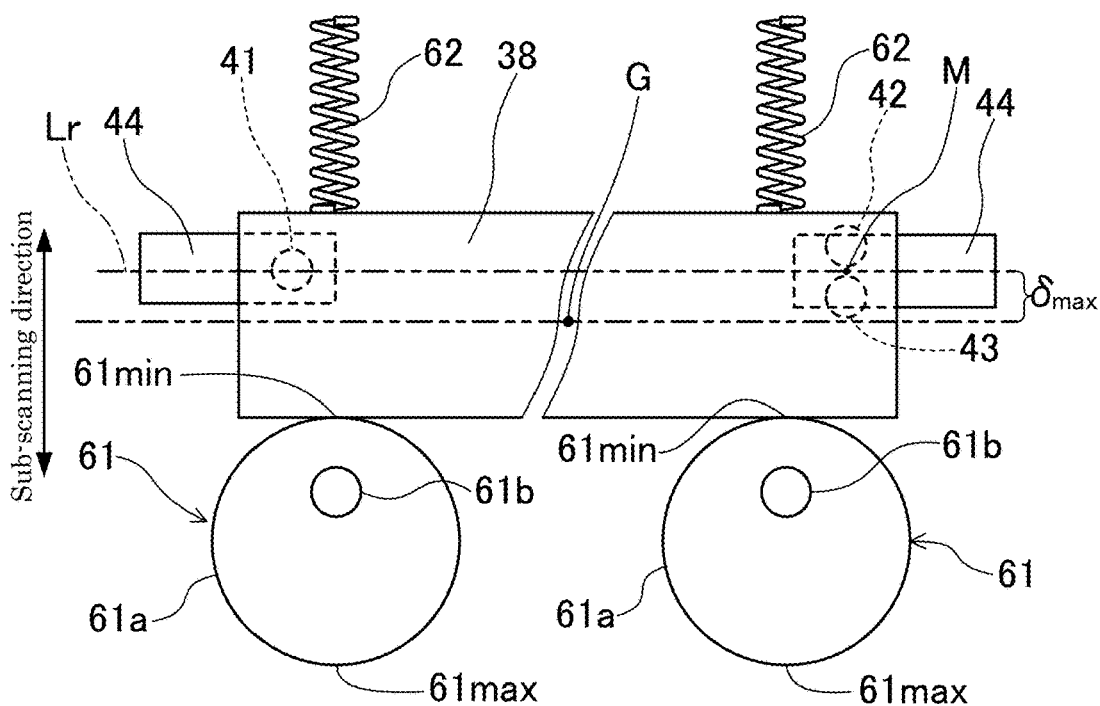
FIG. 9B is a plan view illustrating a mirror position adjustment mechanism when viewed from a reflection surface side of a return mirror and is a view illustrating a state in which a rotation center of a return mirror and a gravity center position of the return mirror are deviated from each other in a sub-scanning direction.

When the cam member 61 is driven to rotate by π/2 in the counterclockwise direction of the drawing by the driving motor 63 from the states of FIG. 8A and FIG. 9A, the return mirror 38 is pressed downward by urging force of the urging member 62 and is moved to a maximum adjustment position (see FIG. 8B and FIG. 9B).

In the maximum adjustment position, the gravity center position of the return mirror 38 is separated to one side in the sub-scanning direction with respect to the rotational axis Lr. A separation amount (hereinafter, referred to as a maximum separation amount) δmax at this time is an amount decided by an eccentric amount of the disc-shaped cam part 61*a*.

Figure 10:
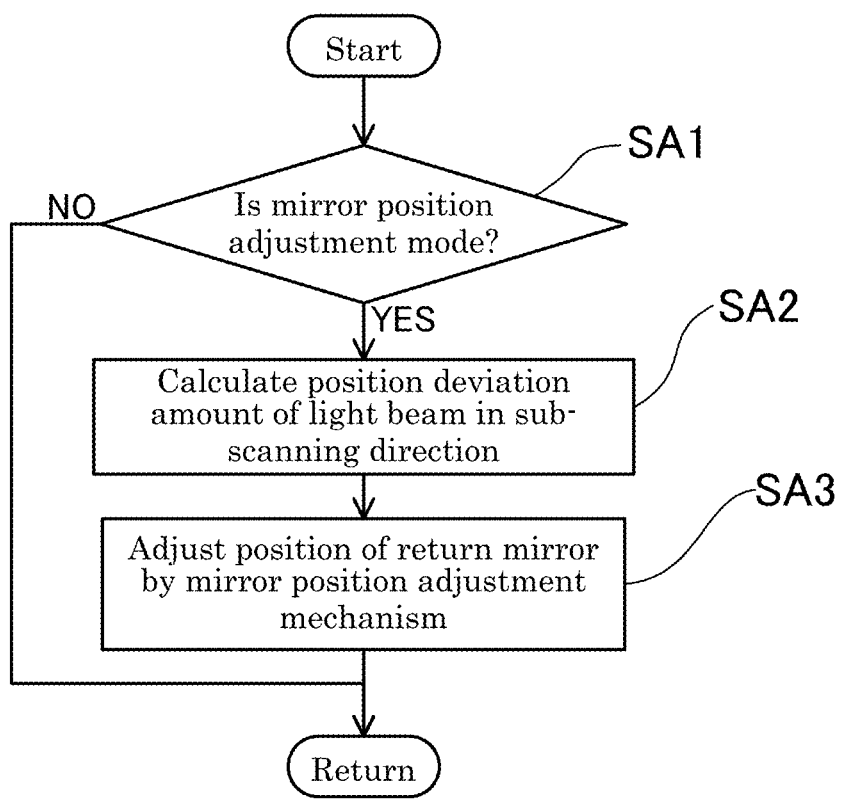
FIG. 10 is a flowchart illustrating an example of mirror position adjustment control performed by a control unit.

Next, with reference to FIG. 10, an example of the mirror position adjustment control performed by the control unit 100 is described.

In an initial step SA1, based on a signal from the input unit 101, it is determined whether an adjustment mode has been set as the operation mode of the laser printer 1. When the determination is NO, the procedure proceeds to return, and when the determination is YES, the procedure proceeds to step SA2.

In step SA2, based on detection signals from the first light detection sensor 51 and the second light detection sensor 52, variation characteristics of a position deviation amount of light beam in the sub-scanning direction according to the rotation of the polygon mirror 35 are calculated.

That is, since a light detection region 51*a* and a second light detection region 52*a* intersect with each other at angles different from each other with respect to the main scanning direction, a difference in time required for the light beam to reach the light detection region 52*a* after passing through the light detection region 51*a*, occurs depending on the position of the light beam in the sub-scanning direction. With reference to the example of FIG. 5, in light beam D1 scanning a reference scanning position decided in advance and light beam D2 scanning a position deviated from the reference scanning position, a difference ΔT (=$t_2-t_1$) occurs in an arrival time required for reaching the light detection region 52*a* after passing through the light detection region 51*a*. In the present embodiment, the arrival time t2 is measured for each scanning of the light beam, the time difference ΔT between the measured arrival time t2 and the reference time t1 is calculated, and the calculated time difference ΔT is converted into a distance W in the sub-scanning direction, so that the variation characteristics of the position deviation amount of the light beam in the sub-scanning direction according to the rotation of the polygon mirror 35 are calculated.

Figure 11:
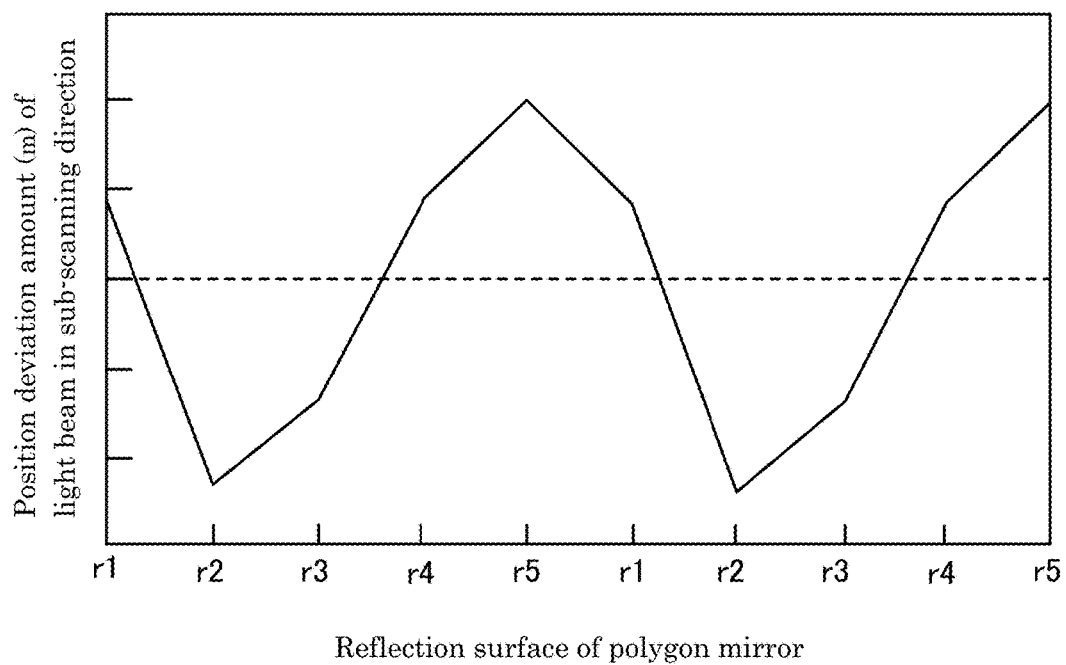
FIG. 11 is a graph illustrating variation characteristics of a position deviation amount of light beam calculated by a control unit.

FIG. 11 is a graph illustrating a calculation result of the variation characteristics of the position deviation amount of the light beam in the sub-scanning direction. In the graph, a vertical axis indicates the position deviation amount of the light beam, and a horizontal axis indicates a rotation angle of the polygon mirror 35 expressed by a number (reflection surfaces r1 to r5 of the pentagonal polygon mirror 35 in the present embodiment) of the reflection surfaces. As apparent from the graph, it can be understood that the position deviation amount of the light beam in the sub-scanning direction is sinusoidally changed at a rotation period of the polygon mirror 35.

In step SA3, the gravity center position G of the return mirror 38 is separated from the rotational axis Lr of the return mirror 38 in the sub-scanning direction. Specifically, the position of the return mirror 38 is moved toward the maximum adjustment position side from the initial position at a predetermined interval, so that the position deviation amount of the light beam in the sub-scanning direction in each movement position is calculated in the form of a graph. Then, the return mirror 38 is moved to a position in which a variation width (for example, a maximum amplitude of the variation characteristics illustrated in the example of FIG. 11) of the calculated position deviation amount of the light beam is minimum.

As described above, in the present embodiment, when the mirror position adjustment mode has been set by the input unit 101, the position of the return mirror 38 is adjusted such that the gravity center position G is separated from the rotational axis Lr by the mirror position adjustment mechanism 60 in the sub-scanning direction.

In this way, the inertia moment of the return mirror 38 around the rotational axis Lr is increased, so that it is possible to increase energy required for rotating the return mirror 38 around the rotational axis Lr. Thus, since the return mirror 38 is difficult to rotate around the rotational axis Lr, the rotational vibration of the return mirror 38 is suppressed, so that it is possible to prevent the occurrence of image failure such as jitter.

Furthermore, in the present embodiment, the position deviation amount of light beam in the sub-scanning direction, which passes through the first light detection sensor 51 and the second light detection sensor 52, is calculated (step SA2), and the position of the return mirror 38 is adjusted such that the amplitude of the calculated position deviation amount of the light beam is minimum. As described above, the position of the return mirror 38 is automatically adjusted, so that it is possible to quickly move the return mirror 38 to an optimal position without depending on a sense of a user.

Embodiment 2

Figure 12:
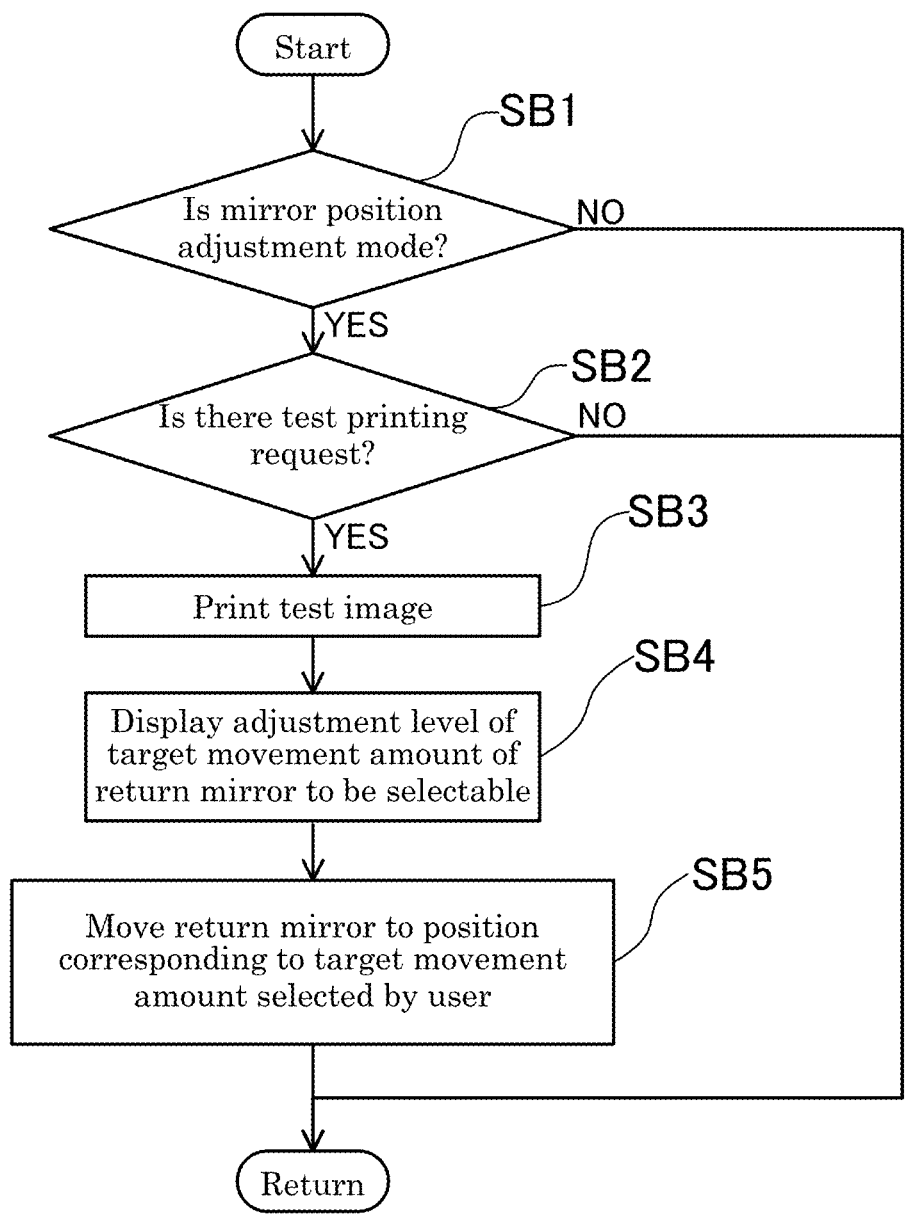
FIG. 12 is a view corresponding to FIG. 10, which illustrates an embodiment 2.

FIG. 12 illustrates the embodiment 2. In this embodiment, the content of the mirror position adjustment control performed by the control unit 100 is different from that in the embodiment 1. In the present embodiment, the control unit 100 serves as a test printing execution unit.

In an initial step SB1, based on a signal from the input unit 101, it is determined whether an adjustment mode has been set. When the determination is NO, the procedure proceeds to return, and when the determination is YES, the procedure proceeds to step SB2.

In step SB2, it is determined whether a test printing start instruction is received by the input unit 101. When the determination is NO, the procedure proceeds to return, and when the determination is YES, the procedure proceeds to step SB3.

Figure 13A:
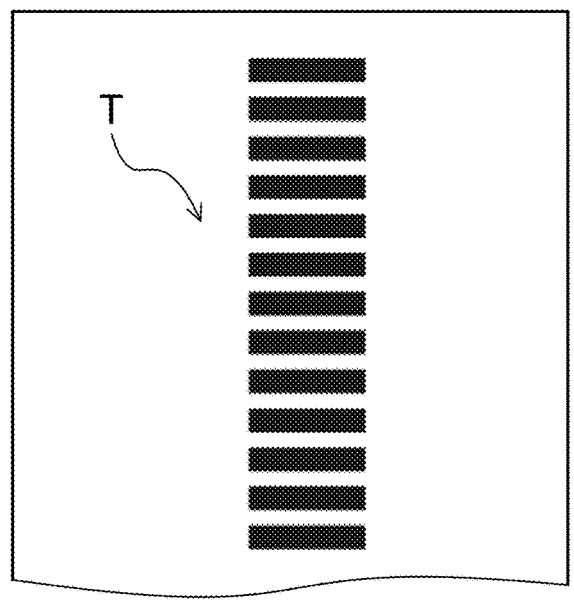
FIG. 13A is a view illustrating an example of a normal test image with no image failure.
Figure 13B:
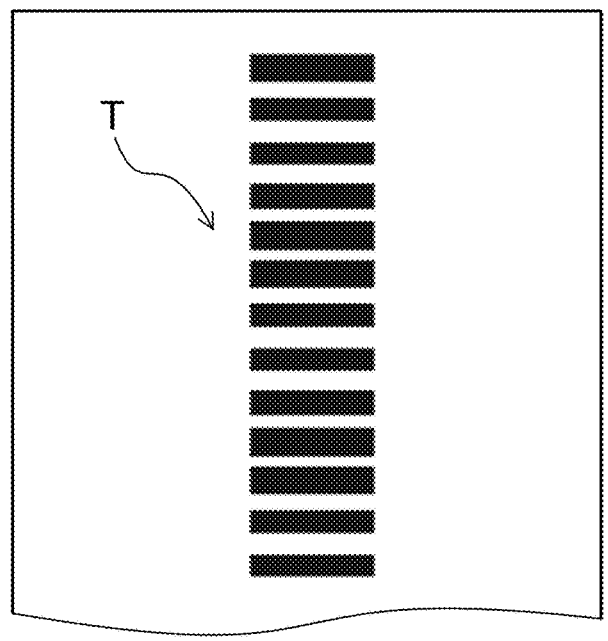
FIG. 13B is a view illustrating an example of a test image with jitter

In step SB3, test printing is performed. In the test printing, for example, a plurality of lines having a predetermined width (for example, two dots) extending in the main scanning direction are printed in a sheet conveyance direction at a predetermined interval. FIG. 13A and FIG. 13B illustrate an example of a printed test image T. It is noted that in FIG. 13A, an interval of lines is constant, but in FIG. 13B, since jitter occurs by the rotational vibration of the return mirror 38, an interval of lines is not uniform.

Figure 14:
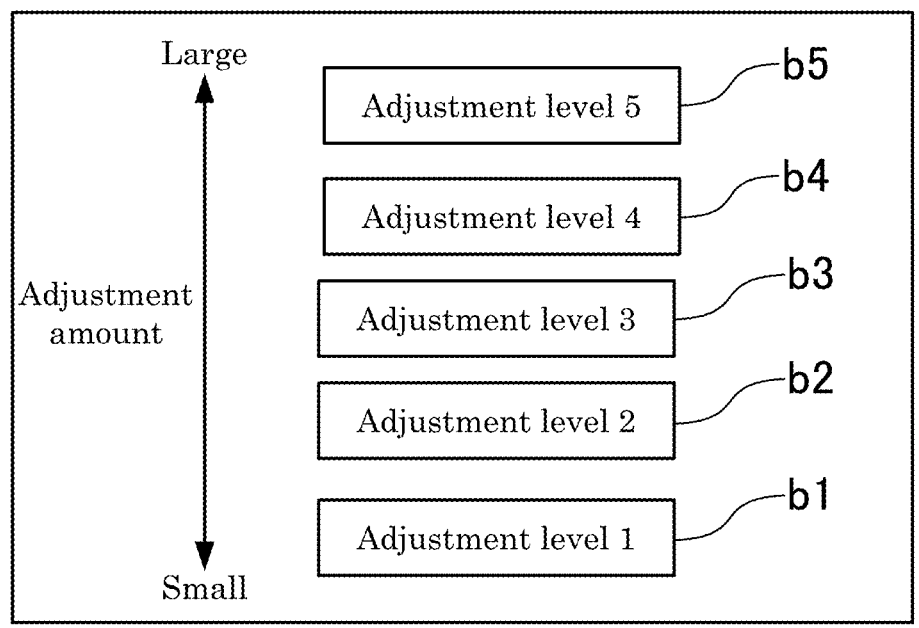
FIG. 14 is a diagram illustrating an example of a selection screen displayed on a display unit.

In step SB4, a setting screen (see FIG. 14) is displayed on the display unit 102. The setting screen is a screen for allowing a user to set a target movement amount of the return mirror 38 when employing, as a reference, a state in which the return mirror 38 is in the aforementioned initial position. In the setting screen, since the target movement amount of the return mirror 38 is divided into five equal steps between a level 0 to a maximum separation amount δmax, a user can select buttons b1 to b5 corresponding to the adjustment levels by his/her fingers. It is noted that the target movement amount of the return mirror 38 may be directly inputted by a numeric keypad and the like.

In step SB5, the target movement amount, which is set when a user selects the buttons b1 to b5 in step SB4, is read. Then, the return mirror 38 is moved to a position corresponding to the read target movement amount, the rotation angle of the driving motor 63 of the mirror position adjustment mechanism 60 is controlled, and then the procedure is returned.

In the present embodiment, the control unit 100 is configured to print a test image T extending in the main scanning direction and including a plurality of lines arranged spaced apart from one another in a sheet conveyance direction, to read the target movement amount of the return mirror 38 inputted by a user via the display unit 102, and to control the position of the return mirror 38 to a position corresponding to the read target movement amount.

In this way, a user can adjust the position of the return mirror 38 while confirming image quality by seeing the test image T. Consequently, it is possible to reliably suppress the occurrence of image failure such as jitter.

Other Embodiments

In the aforementioned embodiment 2, the size of the target movement amount of the return mirror 38 is divided into levels of five steps; however, the present disclosure is not limited thereto and it goes without saying that the level division number may be 4 or less, or 6 or more.

Furthermore, the level division number of the target movement amount of the return mirror 38 may differ according to the number of rotations of the polygon mirror 35. That is, for example, in the optical scanning device 30 capable of switching a low speed mode in which the rotation speed of the polygon mirror 35 is a first speed and a high speed mode in which the rotation speed of the polygon mirror 35 is a second speed higher than the first speed, the level division number of the size of the target movement amount of the return mirror 38 in the high speed mode is considered to be larger than that of the target movement amount in the low speed mode. According to this, as the rotation speed of the polygon mirror 35 is high, it is possible to finely adjust the position of the return mirror 38, so that it is possible to more reliably suppress the rotational vibration of the return mirror 38. It is noted that the division number of the target movement amount of the return mirror 38 is not allowed to differ and a maximum value of the target movement amount may be allowed to differ. In this case, as the number of rotations of the polygon mirror 35 is high, it is sufficient if the maximum value of the target movement amount of the return mirror 38 is increased.

In the aforementioned present embodiment, the example, in which the image forming apparatus is the laser printer 1, has been described; however, the present disclosure is not limited thereto and the image forming apparatus may be a copy machine, a multifunctional peripheral, an MFP and the like.

In the aforementioned embodiment 2, the return mirror 38 is configured to be supported by the three support pins 41 to 43; however, the present disclosure is not limited thereto and it goes without saying that the number of support pins may be 2, or less or 4 or more. For example, when the number of support pins is 4, it is sufficient if both end portions of the return mirror 38 in the main scanning direction are respectively configured to be supported by two support pins. In this case, a straight line, which connects the middle point of support positions by the two support pins provided at one end portion of the return mirror 38 in the main scanning direction to the middle point of support positions by the two support pins provided at the other end portion of the return mirror 38 in the main scanning direction, serves as the rotational axis Lr.

What is claimed is:

1. An optical scanning device comprising:
   a light source;
   a rotating polygon mirror that reflects light beam emitted from the light source, and deflects and scans the reflected light beam;
   a return mirror provided to extend in a main scanning direction, reflecting the light beam reflected by the rotating polygon mirror, and leading the light beam reflected by the rotating polygon mirror to a surface to be scanned;
   a plurality of support pins that support the return mirror from one side surface in a thickness direction; and
   a mirror position adjustment mechanism that is able to move the return mirror in a sub-scanning direction,
   wherein a position of the return mirror is adjusted by the mirror position adjustment mechanism such that a gravity center position of the return mirror is separated in the sub-scanning direction from a rotational axis of the return mirror at a time of rotational vibration, which is decided by support positions of the return mirror by the plurality of support pins.

2. The optical scanning device of claim 1, further comprising:
a position deviation detection unit that detects variation characteristics of a position deviation amount of the light beam reflected by the return mirror in the sub-scanning direction according to rotation of the rotating polygon mirror; and
a control unit that controls operation of the mirror position adjustment mechanism,
wherein the control unit is configured to be able to adjust the position of the return mirror in a predetermined range of the sub-scanning direction by the mirror position adjustment mechanism, and configured to control the position of the return mirror in the predetermined range such that a variation width of the variation characteristics detected by the position deviation detection unit is minimum.

3. An image forming apparatus comprising:
the optical scanning device of claim 1;
a test printing execution unit that prints a test image on a sheet;
a setting unit that allows a user to be able to set a target movement amount of the return mirror in the sub-scanning direction when employing, as a reference, a state in which the rotational axis of the return mirror and the gravity center position of the return mirror coincide with each other in the sub-scanning direction; and
a control unit that controls operation of the mirror position adjustment mechanism, thereby controlling the position of the return mirror in the sub-scanning direction,
wherein the control unit is configured to read a target movement amount set by a user via the setting unit after the test image is printed by the test printing execution unit, and to control the position of the return mirror to a position corresponding to the read target movement amount by the mirror position adjustment mechanism.

4. The image forming apparatus of claim 3, wherein the rotating polygon mirror is able to be switched to a low speed mode in which a rotation speed is a first speed and a high speed mode in which the rotation speed is a second speed higher than the first speed,
the setting unit is configured to be able to set the target movement amount of the return mirror when a user sets one level from the target movement amount in which a plurality of levels have been divided in advance, and
a level division number of a size of the target movement amount in the high speed mode is larger than a level division number of the target movement amount in the low speed mode.

* * * * *